United States Patent
Gomez (10) Patent No.: US 11,193,747 B1
(45) Date of Patent: Dec. 7, 2021

(54) MEASUREMENT DEVICE EXTENSION APPARATUS

(71) Applicant: Andre V. Gomez, Thornton, CO (US)

(72) Inventor: Andre V. Gomez, Thornton, CO (US)

( * ) Notice: Subject to any disclaimer, the term of this patent is extended or adjusted under 35 U.S.C. 154(b) by 0 days.

(21) Appl. No.: 17/340,263

(22) Filed: Jun. 7, 2021

Related U.S. Application Data (60) Provisional application No. 63/035,772, filed on Jun. 7, 2020.

(51) Int. Cl.
*G01B 3/10* (2020.01)
*G01B 3/1056* (2020.01)

(52) U.S. Cl.
CPC .................. *G01B 3/1056* (2013.01)

(58) Field of Classification Search
CPC ..................................... G01B 3/1056
USPC ............................................. 33/770
See application file for complete search history.

(56) References Cited

U.S. PATENT DOCUMENTS

| | | | | |
|---|---|---|---|---|
| 4,603,481 A * | 8/1986 | Cohen .................. | G01B 3/1005 | 33/768 |
| 4,999,924 A * | 3/1991 | Shields ................ | G01B 3/1071 | 33/770 |
| 5,606,803 A * | 3/1997 | O'Sullivan .......... | G01B 3/1071 | 33/759 |
| 5,937,532 A * | 8/1999 | Eirich .................. | B44D 3/38 | 33/758 |
| 6,349,483 B1 * | 2/2002 | Dodge, Sr. .......... | G01B 3/1056 | 33/758 |
| 6,442,863 B1 | 9/2002 | Poineau et al. | | |
| 6,470,589 B2 * | 10/2002 | Simmons ............. | G01B 3/1056 | 33/759 |
| 6,839,981 B2 * | 1/2005 | Rafter ................. | G01B 3/1071 | 33/758 |
| 6,996,915 B2 * | 2/2006 | Ricalde ............... | G01B 3/1071 | 33/770 |
| 7,159,332 B2 * | 1/2007 | Sullivan .............. | G01B 3/1061 | 33/770 |
| 7,434,330 B2 | 10/2008 | McEwan et al. | | |
| 7,596,881 B1 | 10/2009 | Bourgeois | | |
| 7,900,364 B2 * | 3/2011 | Lee ..................... | B43L 9/24 | 33/27.03 |
| 8,225,520 B2 * | 7/2012 | Rabin .................. | G01C 9/34 | 33/668 |
| 9,335,142 B2 * | 5/2016 | DeMartinis ......... | G01B 3/1084 | |

(Continued)

OTHER PUBLICATIONS

"Review: Tape-Ease Tape Measure Accessory Hook," Tool-Rank. com, https://www.tool-rank.com/tool-blog/reviews/review-tape-ease-tape-measure-accessory-hook-201407251667/ [Date accessed: Mar. 4, 2020].

*Primary Examiner* — George B Bennett
(74) *Attorney, Agent, or Firm* — Houda El-Jarrah; Bold IP PLLC (57) ABSTRACT

A tape measure extension apparatus is provided. The apparatus effectively extends the length of a tape measure's hook for attaching to items with corner radii greater than about 0.5 inches. The apparatus includes an attachment portion including a slot adapted to receive and secure the distal end of the tape measure's blade and its corresponding hook. An extension arm extends generally perpendicularly away from the attachment portion thereby replacing the hook of the tape measure. The distal end of the extension arm is coupled to a torque redirection mechanism that minimizes kinking of the tape measure's blade when in use.

20 Claims, 9 Drawing Sheets

(56) References Cited

U.S. PATENT DOCUMENTS

| | | | |
|---|---|---|---|
| 9,816,795 B2* | 11/2017 | Bitton | B25H 7/04 |
| 9,984,589 B2* | 5/2018 | Jain | G01B 3/10 |
| 2004/0049939 A1 | 3/2004 | Rafter | |
| 2015/0362304 A1* | 12/2015 | McCallum | G01B 3/1005 |
| | | | 33/767 |

* cited by examiner

MEASUREMENT DEVICE EXTENSION APPARATUS

CROSS-REFERENCE TO RELATED APPLICATIONS

This application is a non-provisional application which claims priority to U.S. Provisional Patent Application No. 63/035,772 filed on Jun. 7, 2020, which is incorporated by reference in its entirety.

FIELD OF THE INVENTION

This invention relates to measurement devices, including an apparatus that extends the length of a tape measure hook.

BACKGROUND

As is known in the art, the standard hook of a tape measure is typically quite small such that it may only hook onto the edges of objects that are either right-angled and/or that include relatively small corner radii. For example, a typical tape measure hook may be about 0.5 inches long and may therefore only hook onto edges that have corner radii of less than 0.5 inches. Given this, the hook may not be able to hook onto objects with corner radii greater than 0.5 inches due to the hook being too short.

Accordingly, there is a need for an apparatus that extends the length of a tape measure's hook.

In addition, tape measure hook extension devices currently known in the art cause the blade of the tape measure to kink, thereby resulting in unsuccessful measurements.

Accordingly, there is a need for a tape measure extension apparatus that minimizes the forces that cause the tape measure's blade to kink during use. There is also a need for a tape measure extension device that accommodates tape measures with different blade widths.

SUMMARY

According to one aspect, an extension apparatus for a tape measure is provided including an attachment portion including a slot, an extension arm including a proximal end coupled to the attachment portion and a distal end extending away from the attachment portion, a torque redirection mechanism with a first end coupled to the distal end of the extension arm and a second end extending towards the attachment portion, and wherein the slot is adapted to receive the blade of the tape measure.

In one embodiment, the torque redirection mechanism extends away from the distal end of the extension arm at a first angle with respect to the extension arm.

In another embodiment, the first angle is 0°-45°.

In another embodiment, the attachment portion includes a front and a back defining an attachment portion length, and a left side and a right side defining an attachment portion width, wherein the slot extends from the front to the back, and from the right side to the left side a distance less than the attachment portion width.

In another embodiment, the extension arm is coupled to the attachment portion at a location towards the front of the attachment portion.

In another embodiment, the attachment portion's front and back define a longitudinal axis and the extension arm that extends away from the attachment portion at an angle substantially perpendicular to the longitudinal axis.

In another embodiment, the extension arm includes a front that corresponds to the front of the attachment portion and a back that corresponds to the back of the attachment portion, and the torque redirection mechanism faces the back of the extension arm.

In another embodiment, the front of the attachment portion includes a cutout adapted to receive the hook of the tape measure.

In another embodiment, the back of the attachment portion includes a cutout adapted to receive the hook of the tape measure.

In another embodiment, the slot includes a concave up curvature.

In another embodiment, the torque redirection mechanism is adapted to flex with respect to the extension arm.

In another embodiment, the attachment portion's front includes a stop adapted to engage the hook of the tape measure.

In another embodiment, the extension apparatus further includes a left arm support extending from the front left of the attachment portion to the extension arm and a right arm support extending from the front right of the attachment portion to the extension arm.

In another embodiment, the proximal end of the extension arm includes a first width, and the distal end of the extension arm includes a second width, and the first width is greater than or equal to the second width.

According to another aspect, an extension apparatus for a tape measure is provided including an attachment portion including a front and a back defining an attachment portion length, and a left side and a right side defining an attachment portion width, and a first portion and a second portion and a slot between the first portion and the second portion, wherein the slot extends from the front to the back, and from the right side to the left side a distance less than the attachment portion width. The extension apparatus for a tape measure may further include an extension arm that includes a proximal end coupled to the attachment portion and a distal end extending away from the attachment portion, as well as a torque redirection mechanism with a first end coupled to the distal end of the extension arm and a second end extending towards the attachment portion at a first angle with respect to the extension arm, whereby the first angle is 0°-30°, and whereby the slot is adapted to receive the blade of the tape measure.

The presently disclosed system and method for using an extension apparatus for a tape measure is more fully described in the detailed description below.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

The present description is directed to one or more non-limiting embodiments for an extension apparatus for a tape measure. Further details are provided below with respect to the Figures.

Figure 1A:
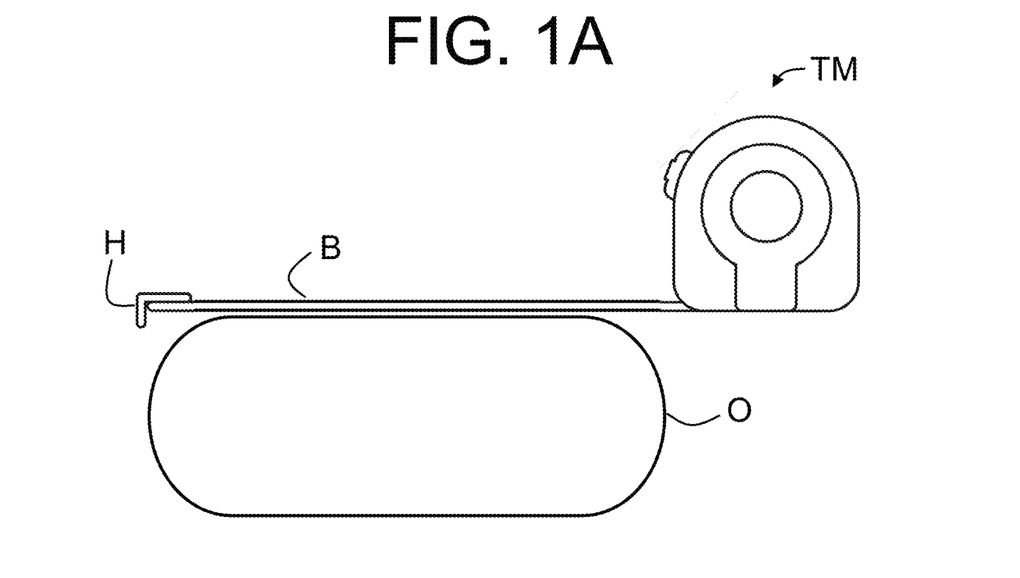
FIG. 1A shows a side view of aspects of a standard tape measure according to exemplary embodiments hereof.
Figure 1B:
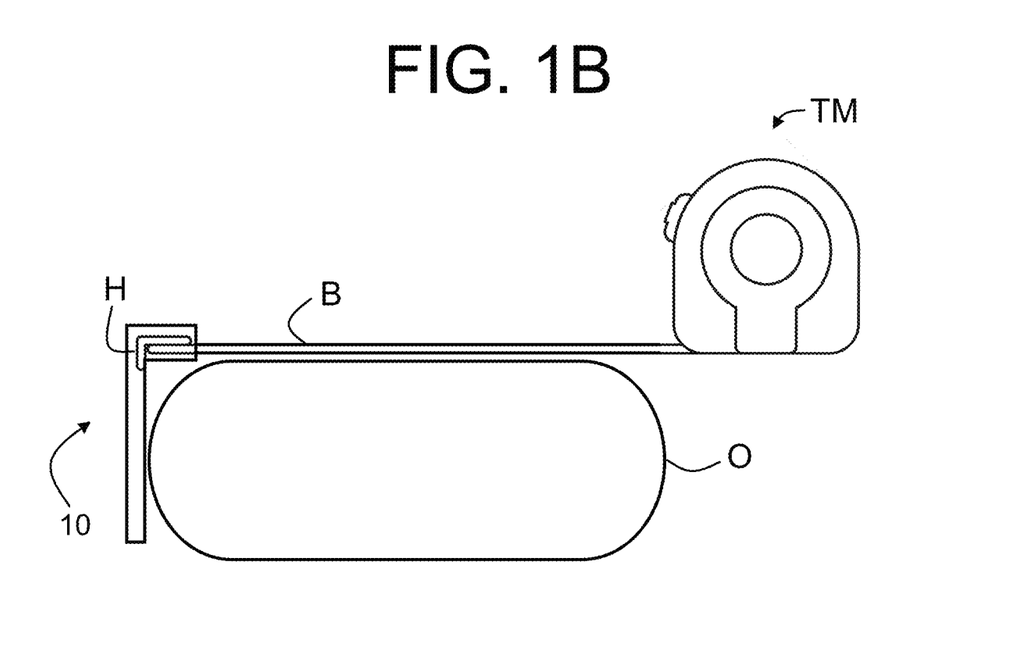
FIG. 1B shows a side view of aspects of a standard tape measure configured with an extension apparatus according to exemplary embodiments hereof.

As is known in the art and as shown in FIGS. 1A and 1B, standard tape measuring devices, often referred to as tape measures TM, include an extendable measuring blade B with a hook H configured at the blade's distal end (typically extending downward at a perpendicular angle with respect to the blade B). The hook H is used to attach (i.e., hook) the distal end of the blade B to an object O, as shown in FIGS. 1A-1B, associated with the far point of a measurement so that the distance between the body of the tape measure TM and the hook H may be determined by reading the blade's tick-marks denoting the extension length of the blade B.

In some embodiments, the current invention provides an extension apparatus 10, as shown in FIG. 1B, that may be configured with a tape measure's standard hook H, and that effectively extends the length of the hook H. In some embodiments, the apparatus 10 may be attached to an existing measuring device to add its functionalities to the existing device. In these embodiments, the apparatus 10 may be considered an accessory. In other embodiments, the apparatus 10 may be integrally provided as an element of a measuring device such that the measuring device inherently includes the functionality of the apparatus 10.

As is known in the art, the standard hook H of a tape measure TM is typically quite small such that it may only hook onto the edges of objects O that are either right-angled and/or that include relatively small corner radii. For example, a typical tape measure hook H may be about 0.5 inches long and may therefore only hook onto edges that have corner radii of less than 0.5 inches. Given this reality, as is shown in FIG. 1A, the standard hook H may be too short to hook onto objects O with corner radii or cross-sectional circular radii (e.g., the side of a pipe) greater than 0.5 inches.

In some embodiments as shown in FIG. 1B, the extension apparatus 10 attaches to the tape measure's hook H and extends downward a greater distance than the hook H itself (e.g., 6 inches). In this way, the extension apparatus 10 may hook onto an edge of greater corner radii, and/or of greater cross-sectional circular radii, and the tape measure TM may be enabled to measure the length of the object O as shown.

Figure 2:
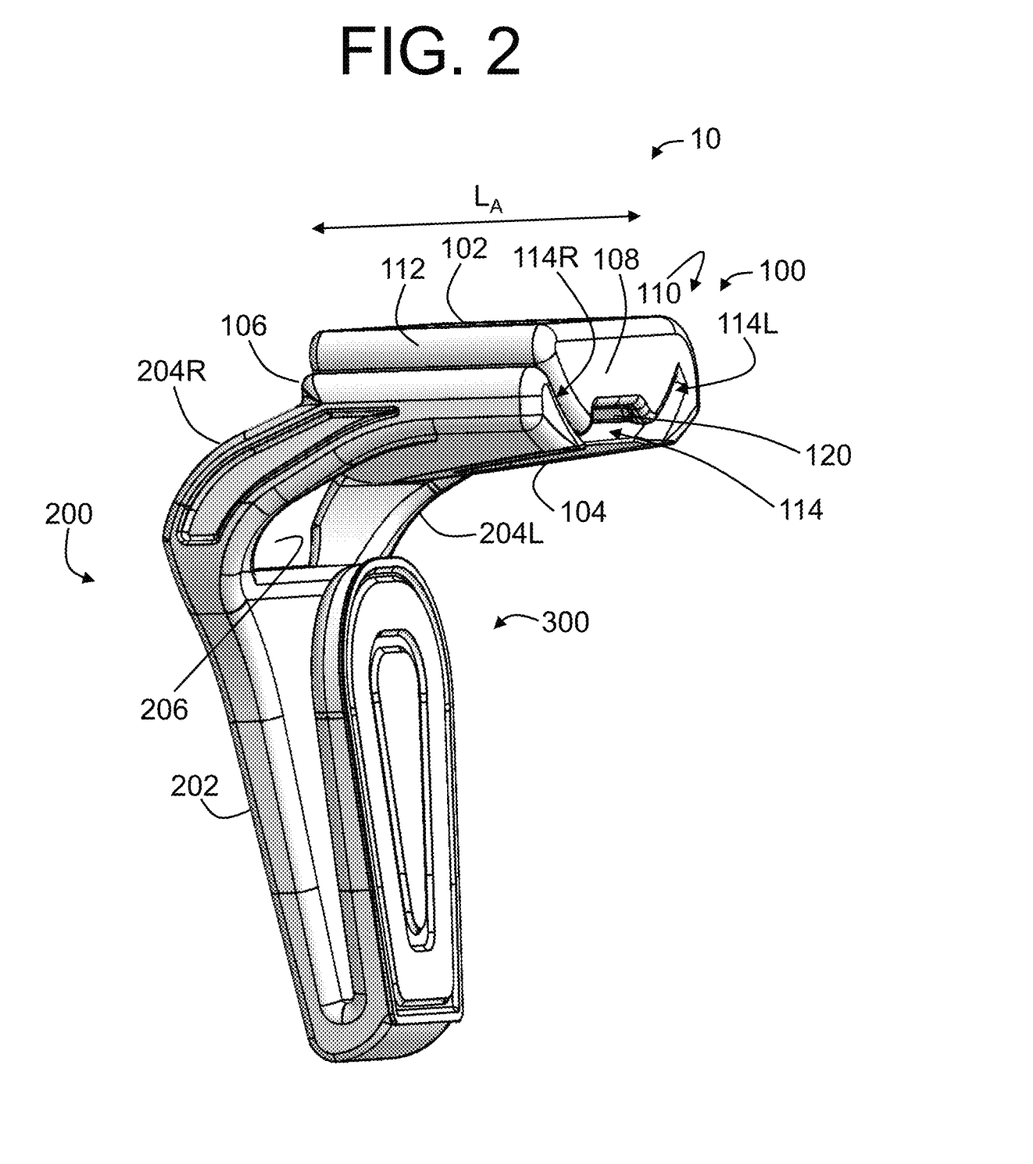
FIG. 2 shows a side view of aspects of a measurement device extension apparatus according to exemplary embodiments hereof.

In one exemplary embodiment hereof, as shown in FIG. 2, the apparatus 10 may include an attachment portion 100, an extension portion 200 and a torque redirection mechanism 300. In general, the attachment portion 100 may attach the apparatus 10 to the hook H of a tape measure TM such that the extension portion 200 effectively replaces the hook H. As will be described in other sections, the torque redirection mechanism 300 minimizes the kinking of the tape measure's blade B, as shown in FIGS. 1A-1B, when in use. The assembly 10 also may include other components and elements as necessary for the assembly 10 to perform its functionalities.

Attachment Portion 100

Figure 3:
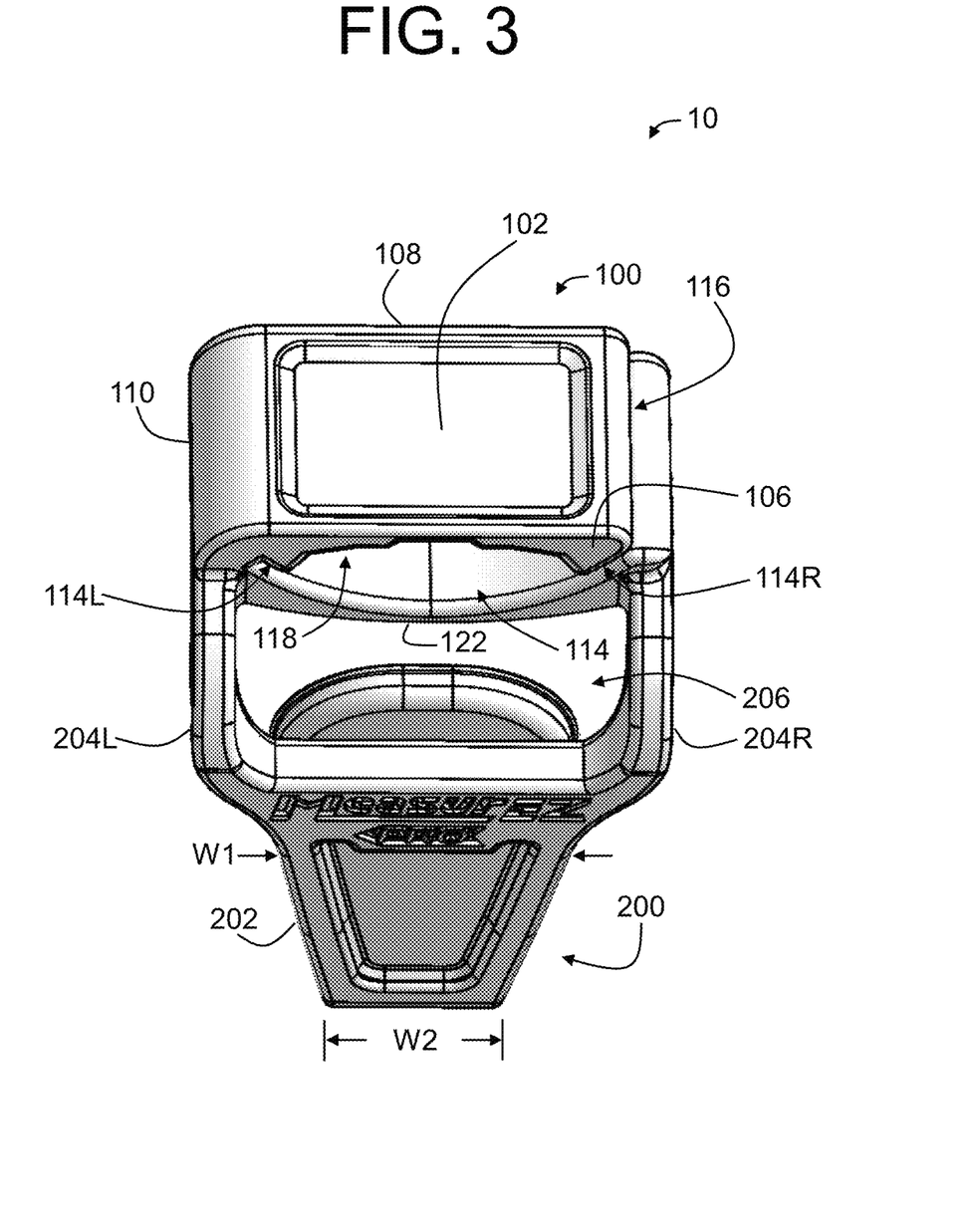
FIG. 3 shows a top view of aspects of a measurement device extension apparatus according to exemplary embodiments hereof.

In some embodiments as shown in FIGS. 2-3, the apparatus 10 includes an attachment portion 100 adapted to removably attach the apparatus 10 to a hook H and blade B of a tape measure TM. In some embodiments the apparatus 10 does not use fasteners (e.g., rivets, screws, bolts, adhesive, or other types of fasteners) but instead uses customized slot(s) to receive and secure the hook H and blade B.

In one exemplary embodiment hereof as shown in FIGS. 2-3, the attachment portion 100 includes a top 102, a bottom 104 (shown in FIG. 2), a front 106, a back 108, a left side 110 and a right side 112. The top 102 and the bottom 104 may be formed as walls, one or more rails or bars, or as any suitable support structures that together may form a slot 114 therebetween to receive the blade B of a tape measure TM as described herein. The front 106 and the back 108 may define a longitudinal axis $L_A$, as shown in FIG. 2, of the attachment portion 100.

In some embodiments, a slot 114 is formed between the top 102 and the bottom 104 that includes a left slot portion 114L and a right slot portion 114R. The slot 114 is adapted to receive and secure a portion of the tape measure's blade B to generally secure the apparatus 10 to the tape measure TM. Accordingly, it is preferable that the slot 114 include a height (thickness) that generally matches the thickness of the tape measure's blade B.

As is known in the art, most tape measure blades B include an upward facing concave cross-sectional curvature (looking into the distal end of the blade B) to provide the blade B with a degree of rigidity when extended from the tape measure TM. Note that an upward facing concave curvature also may be referred to as a concave up curvature. This enables the blade B to be extended without easily kinking. In some embodiments (best seen in FIG. 3), the slot 114 includes a curvature from its left portion 114L to its right portion 114R that generally matches the concave up curvature of the blade's cross section so that the blade B may be received into the slot 114 and be held snugly therein. In some embodiments, the width of the slot 114 (and of the associated left and right slot portions 114L, 114R) is chosen to accommodate different widths of different tape measurement blades B that may have been available on the market in the past, during the present and/or in the future. In this way, the extension apparatus 10 may be used with a wide variety of tape measures with differing blade widths.

In some embodiments as shown in FIG. 3, the slot 114 includes a slot opening 116 that may receive the blade B into the slot 114. The slot opening 116 may be configured with the left slot portion 114L and/or with the right slot portion 114R, and/or anywhere therebetween. The slot opening 116 may generally extend from the front 106 of the attachment portion 100 to the back 108 of the attachment portion 100 so that a longitudinal body portion of the blade B may be inserted through the slot opening 116 and into the slot 114.

Figure 4:
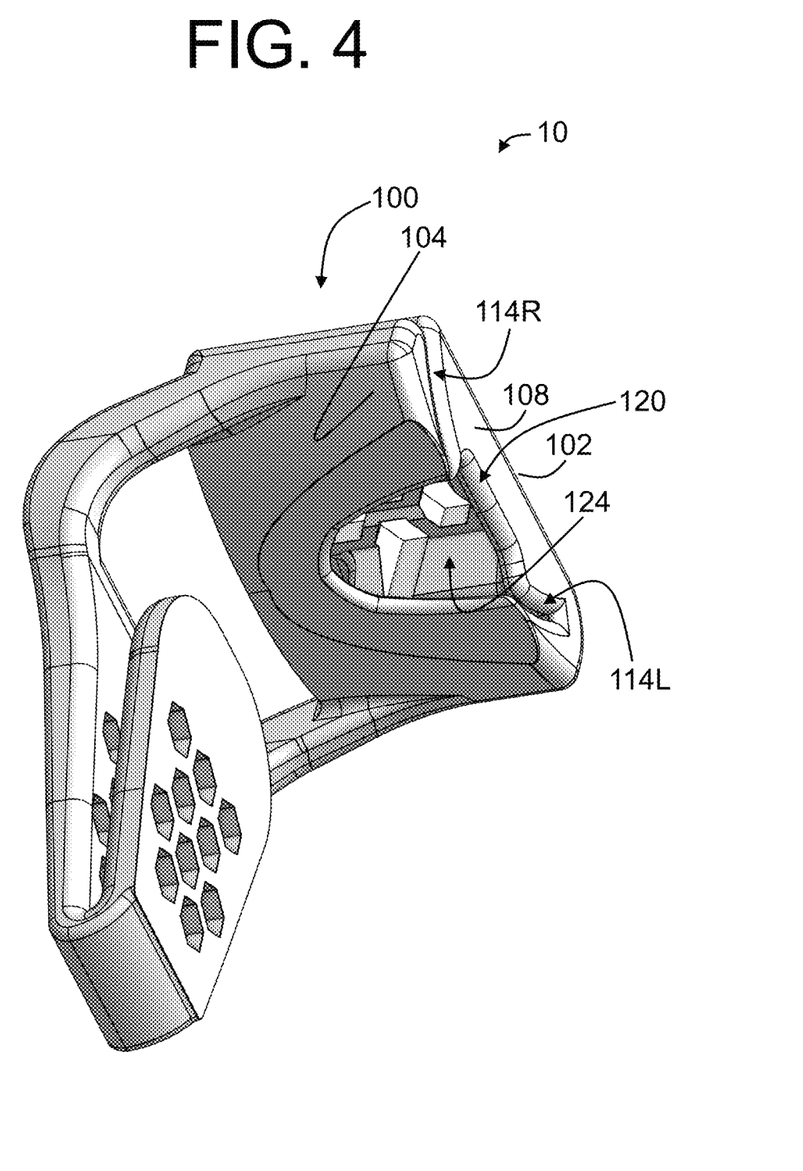
FIG. 4 shows a bottom view of aspects of a measurement device extension apparatus according to exemplary embodiments hereof.
Figure 9:
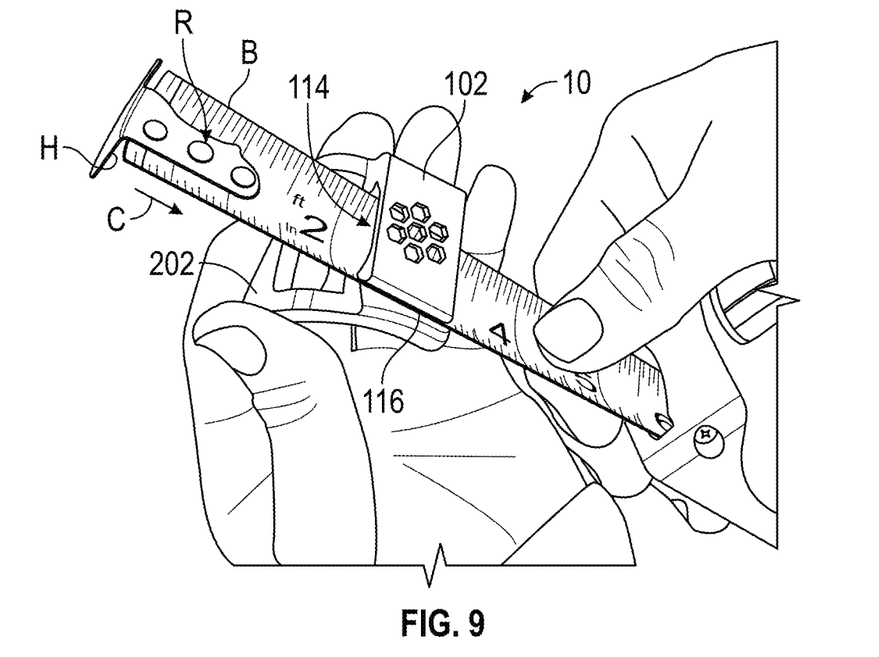
FIG. 9 shows a second demonstrational step that may be taken to configure a measurement device with an extension apparatus according to exemplary embodiments hereof.
Figure 10:
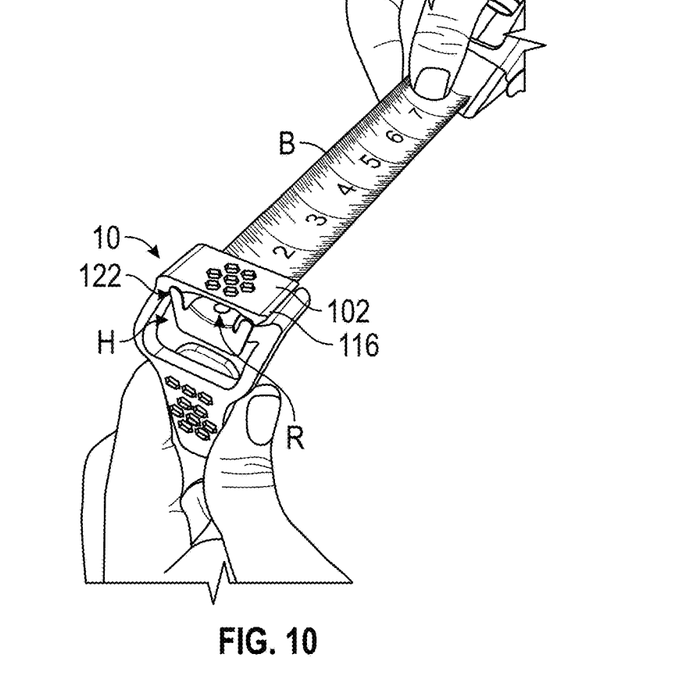
FIG. 10 shows a third demonstrational step that may be taken to configure a measurement device with an extension apparatus according to exemplary embodiments hereof.

In some embodiments, the slot 114 includes an upper front cutout 118 (e.g., in the front bottom of the top portion 102 as shown in FIG. 3) and an upper back cutout 120 (e.g., in the back bottom of the top portion 102 as shown in FIGS. 2 and 4) that accommodate the hook H (and any rivets R that may attach the hook H to the distal end of the blade B as shown in FIGS. 9-10) when the hook H and blade B are configured with the attachment portion 100. In this embodiment, it may be preferable that the left slot portion 114L and/or the right slot portion 114R adequately secure the blade B in the left and right areas of the slot 114 adjacent the cutout 118, respectively, so that the blade B is held snugly therein. In some embodiments, the upper front cutout 118 and/or the upper back cutout 120 is enlarged (e.g., taller) to also accommodate a magnet that may be integrated into the hook H of a magnet-tipped tape measure blade B.

As seen in FIG. 3, the attachment portion 100 includes a front lower edge 122 (e.g., the front edge of the bottom 104) that acts as a stop to the hook H and that in doing so, generally places the hook H in the proper position within the extension apparatus 10 for use. This will be described in further detail in other sections.

In some embodiments as shown in FIG. 4, the bottom 104 includes a bottom cutout 124 through which a bottom surface of a tape measure's blade B may extend when configured with the apparatus 10. In some embodiments, the bottom surface of the tape measure's blade B may extend through the cutout 124 and be positioned to coincide with the bottom surface of the bottom 104 of the apparatus 10. In this way, the extension apparatus 10 may be adapted to place the blade B of the tape measure TM generally flush with the top surface of the object O that it may be measuring. This may coincide with the normal usage of a tape measure TM (e.g., when not configured with an extension apparatus 10) during which the blade B is placed flush with the top surface of the object O during the measurement procedure.

Extension Portion 200

In some embodiments as shown in FIG. 2, the extension portion 200 includes an extension arm 202 configured with the attachment portion 100 and extending away from the attachment portion 100 at an angle substantially perpendicular to the longitudinal axis longitudinal axis $L_A$ of the attachment portion. For the purposes of this specification, the term substantially perpendicular will mean 90°±45°. In some embodiments, the extension arm 202 extends in the same general direction as the direction in which the hook H extends when the hook H is configured within the attachment portion 100. In this way, the extension arm 202 effectively replaces the hook H of the tape measure TM or simply adds to it by providing an extended length.

In some embodiments as shown in FIG. 3, the extension arm 202 may include an upper width W1 and a lower width W2, and the extension arm 202 may taper from a larger upper width W1 to a smaller lower width W2. In other embodiments, the extension arm may taper from a smaller upper width W1 to a larger lower width W2. In any event, the taper may be linear, parabolic, follow different curvatures and any combination thereof. In other embodiments, the upper and lower widths W1, W2 may be generally equal, and the extension arm 202 may not include a taper. It is understood that the extension arm 202 may include any shape or form that may generally extend from the attachment portion 100, and that the scope of the extension apparatus 10 is not limited in any way by the shape or form of the extension arm 202.

In some embodiments, the upper portion of the extension arm 202 includes a left arm support 204L and a right arm support 204R adapted to connect the extension arm 202 to the attachment portion 100. The left arm support 204L generally extends from the left upper portion of the extension arm 202 to the left side 110 of the attachment portion 100, and the right arm support 204R may generally extend from the right upper portion of the extension arm 202 to the right side 112 of the attachment portion 100. The left and right arm supports 204L, 204R may hold the extension arm 202 in its proper and generally downward extending position for use.

In some embodiments, the left and right arm supports 204L, 204R form an opening 206 (between the supports 204L, 204R) in the front area of the adjoining attachment portion 100 and extension portion 200. The opening 206 may accommodate the hook H of the tape measure TM during the attachment of the extension apparatus 10 to the tape measure TM as will be described in other sections.

While the extension portion 200 has been described above as including one extension arm 202, it is understood by a person of ordinary skill in the art that the extension portion 200 may include any number of extension arms 202 and that the scope of the apparatus 10 is not limited in any way by the number of extension arms 202 that it may include. For example, the extension portion 200 may include two or more extension arms 202. In some embodiments, the two or more extension arms 202 may extend parallel with one another and be configured side-by-side. In other embodiments, the two or more extension arms 202 may be oriented at offset angles with respect to one another, e.g., perpendicular, at 45°, at 180° and/or at other offset angles. It also is understood that the extension portion 200 may include additional arm supports 204 as required. It also is understood that the extension portion 200 may be directly formed with the attachment portion 100 such that the arm supports 204 are integrally formed with the extension portion 200 and/or with the attachment portion 100.

Torque Redirection Mechanism 300

Figure 5A:
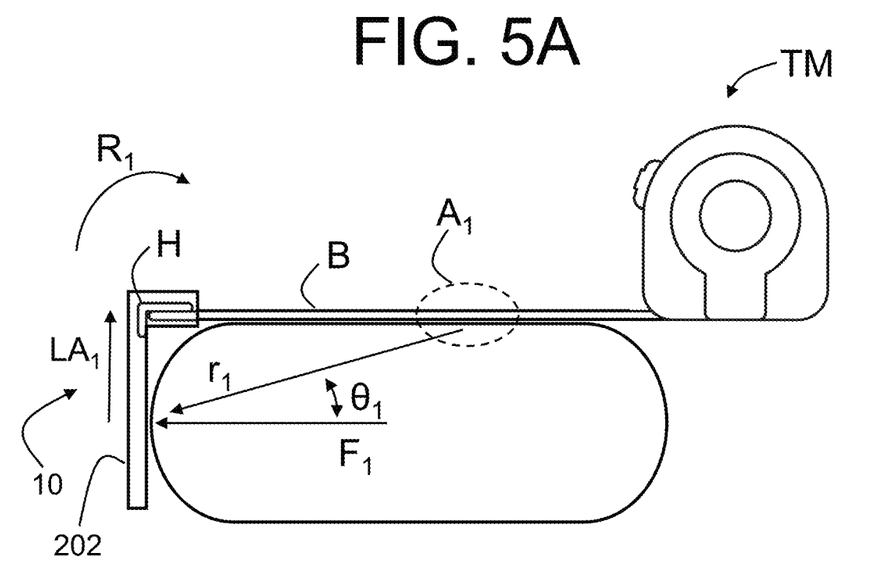
FIG. 5A shows aspects of a standard tape measure configured with an extension apparatus according to exemplary embodiments hereof.
Figure 5B:
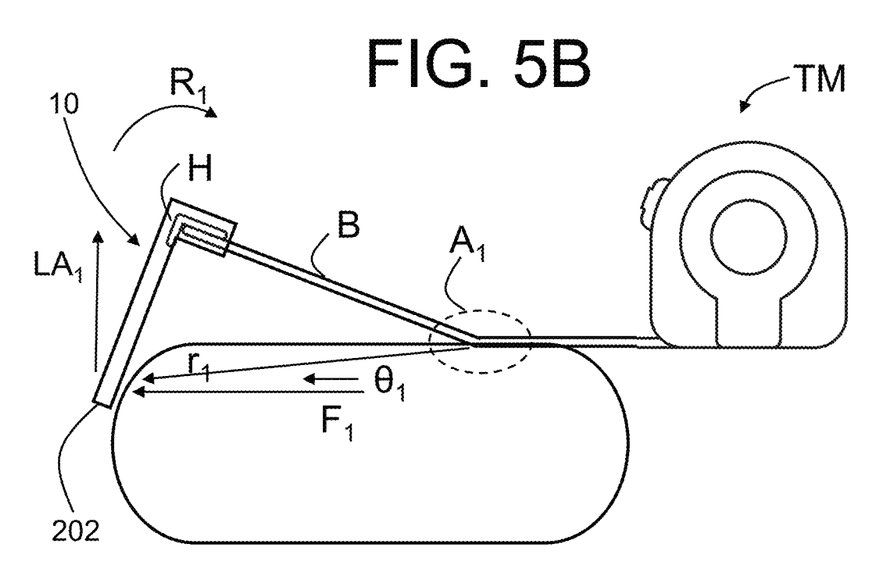
FIG. 5B shows aspects of a standard tape measure configured with an extension apparatus according to exemplary embodiments hereof.

As is known in the art, when using a tape measure TM, the hook H is placed against the far end point of the measurement and the blade B is generally pulled taut so that the distance between the hook and the tape measure TM may be determined. Similarly, and as shown in FIG. 5A, when using a tape measure TM equipped with the extension apparatus 10, the extension arm 202 may be placed against the far end of the object O and the blade B may be pulled taut. In this case however, because the apparatus 10 is rigidly attached to the hook H and may not rotate about the blade B, pulling the blade B taut may exert a force to the extension arm 202 that may cause the blade B to kink as described below.

As shown in FIG. 5A, the sideways force $F_1$ applied to the extension arm 202 at the point of contact between the extension arm 202 and the object O may be modeled as a torque $T_1$ applied to the arm 202 about an axis of rotation $A_1$ located along the blade B. The location of the axis of rotation $A_1$ will depend on the extended length of the blade B, the rigidity of the blade B, the corner radii of the object O, the amount of force applied to the extension arm 202 and other factors. For the purposes of this specification, the axis of rotation $A_1$ will be depicted as the dashed area $A_1$ and it is understood that the location of the axis $A_1$ is meant for demonstration only.

The torque $T_1$ may generally be given by:

$$T_1 = r_1 F_1 \sin \theta_1$$

Where:

$T_1$ is the applied torque;

$r_1$ is the distance from the axis of rotation to the point of force;

$F_1$ is the applied force; and $\theta_1$ is the angle between $F_1$ and $r_1$

The corresponding torque lever arm $LA_1$ is shown as the perpendicular distance from the line of action of the sideways force $F_1$ to the axis of rotation $A_1$.

As the sideways force $F_1$ is applied, the torque $T_1$ causes the extension apparatus 10 and the hook H to begin rotating in a generally clockwise direction as represented by $R_1$ about the axis of rotation $A_1$ causing the blade B to kink. As such, any ensuing measurement effort may be unsuccessful.

To solve this problem, in some embodiments, the extension apparatus 10 includes a torque redirection mechanism 300.

Figure 6:
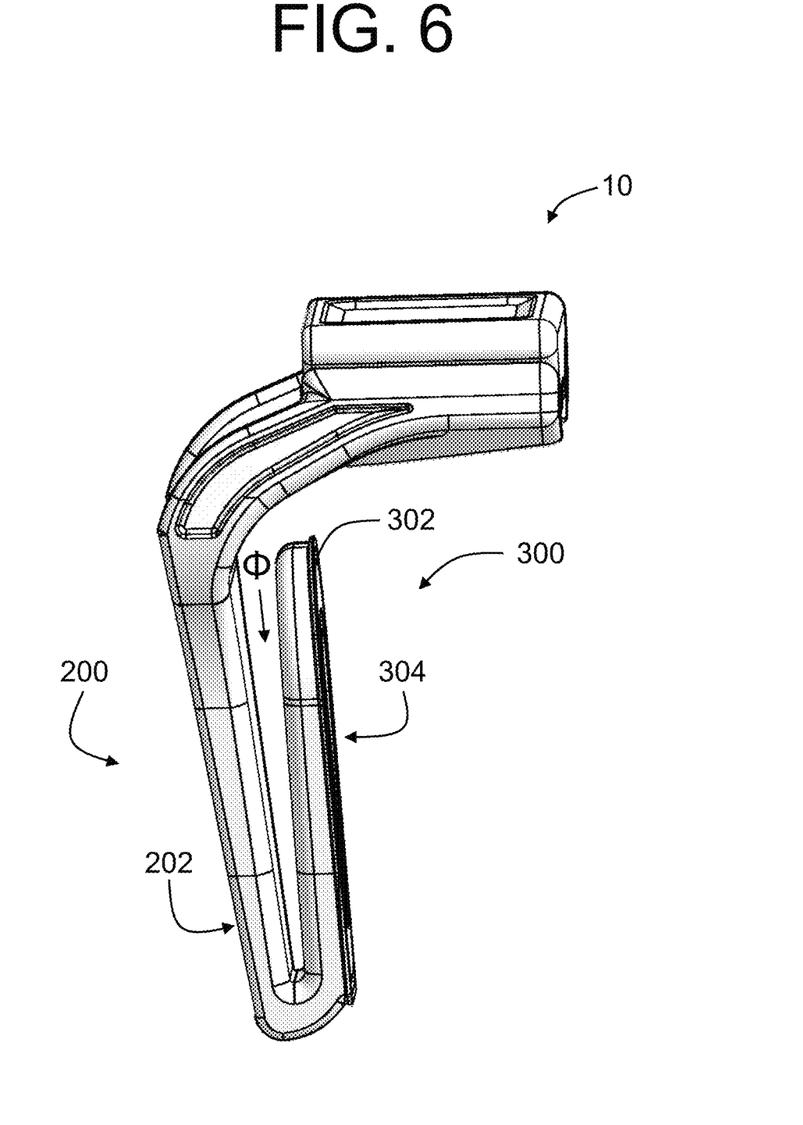
FIG. 6 shows a side view of aspects of a measurement device extension apparatus according to exemplary embodiments hereof.

As shown in FIG. 6, the torque redirection mechanism 300 includes a torque arm 302 configured with the extension arm 202 at a point at or near the lower distal end of the extension arm 202. The torque arm 302 extends from the lower distal end of the extension arm 202 upward on the inner side of the arm 202 and at an acute angle $\Phi$ with respect to the arm 202. In some embodiments, the angle $\Phi$ is about 0°-75°, and preferably about 0°-45°, and more preferably 0°-30°. However, it is understood that the angle $\Phi$ may include any angle that may be required. The length of the torque arm 302 may be equal to, greater than or less than the length of the extension arm 202. For example, in some embodiments, the length of the torque arm 302 is about 50%-100% the length of the extension arm 202, about 70%-90% the length of the extension arm 202, or other lengths. It is understood that the scope of the apparatus 10 is not limited in any way by the length of the torque arm 302 or by the angle $\Phi$ of its orientation.

Figure 7:
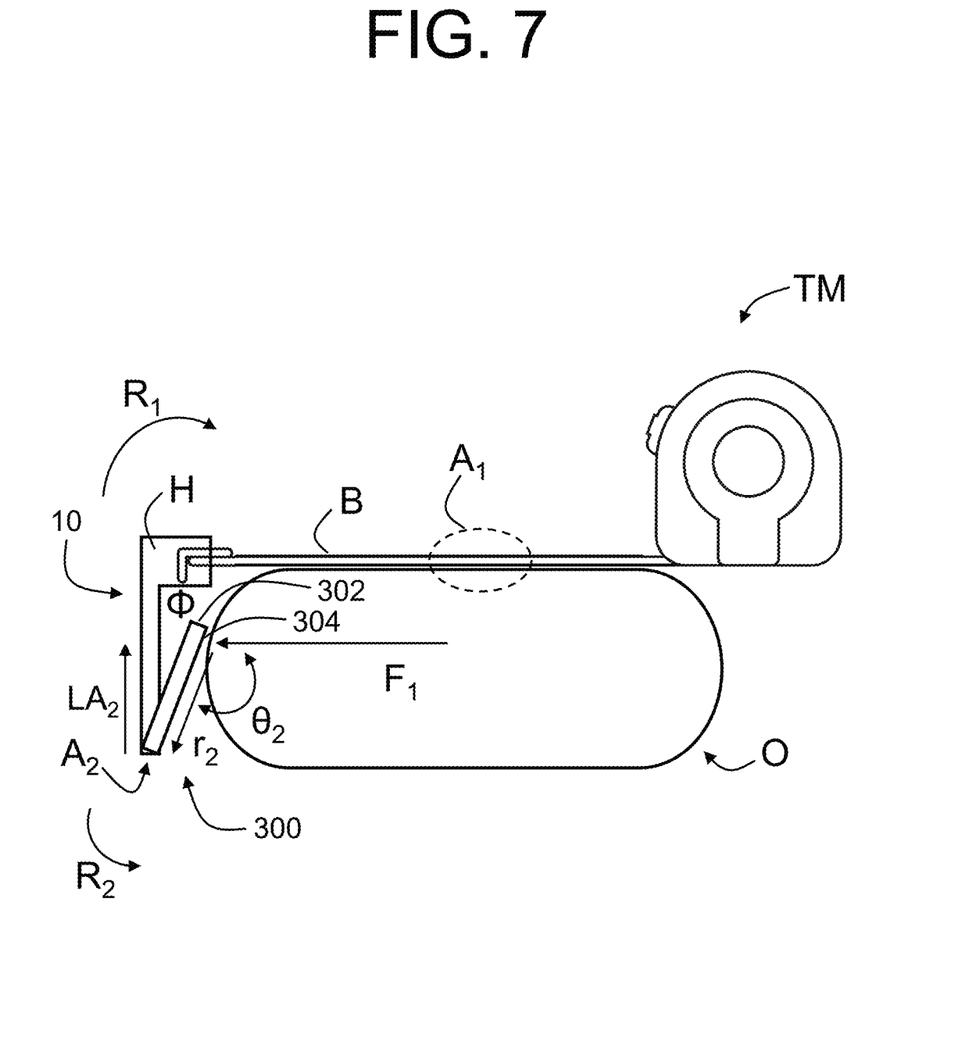
FIG. 7 shows aspects of a standard tape measure configured with an extension apparatus according to exemplary embodiments hereof.

In some embodiments as shown in FIG. 7, the torque redirection arm 302 includes an inner surface 304 that is adapted to contact a far-end of an object O being measured during a measurement procedure. As shown, the sideways force $F_1$ applied to the torque arm 302 at the point of contact between the torque redirection arm 302 and the object O may be modeled as a torque $T_2$ applied to the torque arm 302 about an axis of rotation $A_2$ located at the joining point of the extension arm 202 and the torque redirection arm 302.

The torque $T_2$ may generally be given by:

$$T_2 = r_2 F_1 \sin \theta_2$$

Where:

$T_2$ is the applied torque;

$r_1$ is the distance from the axis of rotation to the point of force;

$F_1$ is the applied force; and $\theta_2$ is the angle between $F_1$ and $T_2$

The corresponding torque lever arm $LA_2$ is shown as the perpendicular distance from the line of action of the sideways force $F_1$ to the axis of rotation $A_2$.

As the sideways force $F_1$ is applied, the torque $T_2$ causes an opposing force to the torque $T_1$ that tends to cause a rotation of the extension arm 202 in a generally counter-clockwise direction as represented by $R_2$ about the axis of rotation $A_2$. In some embodiments, the counterclockwise rotational forces caused by the torque $T_2$ tend to counteract the clockwise rotational forces caused by the torque $T_1$, thereby reducing the potential kinking of the blade B. In this way, the blade B may not kink during the measurement procedure resulting in a successful measurement.

In some embodiments, when the force $F_1$ is applied to the torque redirection arm 302 at the surface 304, the torque arm 302 may deflect (flex) slightly towards the extension arm 202 (about the axis of rotation $A_2$). In some embodiments, the torque arm 302 is adapted such that when it deflects (flexes) towards the extension arm 202 an amount typical during normal use (e.g., a maximum allowable amount), the torque arm's inner surface 304 aligns vertically with the inner surface of the tape measure's hook H thereby preserving the far end reference point of the tape measure TM. In this way, measurements taken while utilizing the extension apparatus 10 may be accurate. In other embodiments, the torque arm 302 is rigid such that its deflection during use is minimized, and the torque arm's inner surface 304 is generally aligned with the inner surface of the tape measure's hook H. It is understood that depending on the flexibility of the torque arm 302, the inner surface 304 may be generally aligned with the inner surface of the tape measure's hook H however required to preserve the far reference point of the tape measure TM.

In Use

Various embodiments and details of the presently disclosed apparatus will be described by way of several in-use examples. The examples provided below are chosen to illustrate various embodiments and implementations of the apparatus 10, and those of ordinary skill in the art will appreciate and understand, upon reading this description, that the examples are not limiting and that the apparatus 10 may be used in different ways. It is also understood that details of different embodiments described in different examples may be combined in any way to form additional embodiments that are all within the scope of the apparatus 10.

Figure 8:
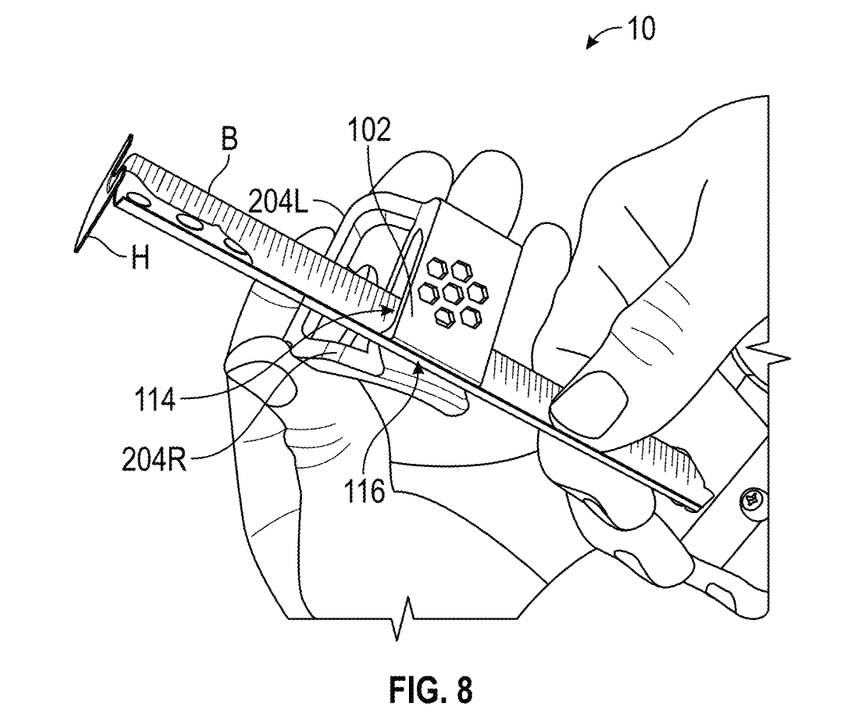
FIG. 8 shows a first demonstrational step that may be taken to configure a measurement device with an extension apparatus according to exemplary embodiments hereof.

To attach the extension apparatus to a tape measure TM, the following actions may be taken. First, the blade B of the tape measure TM may be placed into the slot opening 116 as shown in FIG. 8. Next, the blade B may pass through the slot opening 116 and into the slot 114 as shown in FIG. 9. The blade B may then be moved in the direction of arrow C (shown in FIG. 9) so that the hook H enters into the cutout 118 and the lower inner surface of the hook H abuts against the front lower edge 122 (e.g., the front edge of the bottom 104) of the attachment portion 100. This places the hook H in the proper position within the extension apparatus 10 for use as shown in FIG. 10.

Figure 11:
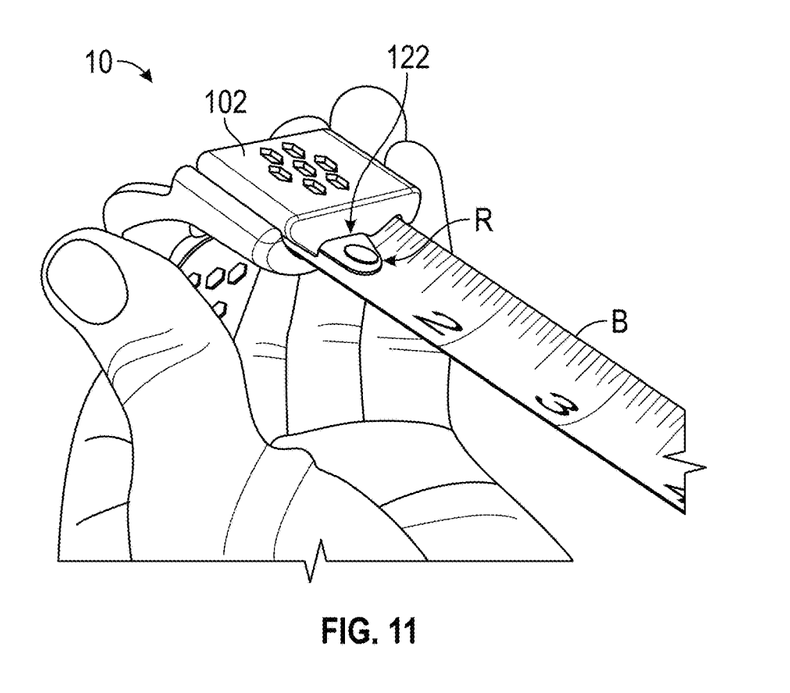
FIG. 11 shows a fourth demonstrational step that may be taken to configure a measurement device with an extension apparatus according to exemplary embodiments hereof.

FIG. 11 shows the rear portion of the hook H (and the rivets R that may attach the hook H to the distal end of the blade B) accommodated within the slot 114 (e.g., as shown in FIG. 2) and the slot's upper back cutout 120 (e.g., as also shown in FIG. 2 and in the back bottom of the top portion 102).

Note that the hook H may be held within the attachment portion 100 in this configuration by pressure fit, inner clips and/or notches configured with the slot 114, inner detents configured with the slot 114, by other attachment mechanisms and any combination thereof.

It is understood that the steps described above are meant for demonstration and that not all of the steps may be required at all times. It is also understood that other steps not described may be included.

To remove the extension apparatus 10 from the tape measure TM, the steps above may be followed in a generally reverse order.

In some embodiments, the extension apparatus 10 comprises any type of plastic (e.g., ABS, Polycarbonate, etc.), any type of rubber, any type of composite material(s), wood, metal, any other suitable material, and any combination thereof.

In some embodiments, any portion(s) of the extension apparatus 10 may include cutouts, openings, recesses, or other structures adapted to reduce the amount of material used to produce the apparatus 10 and to reduce the overall weight of the apparatus 10.

In some embodiments, the extension apparatus 10 may be about 1-3 inches wide, 1-3 inches long and about 3-8 inches tall. However, it is understood that any portions of the apparatus 10 may include any dimensions as required for its application. For example, in some embodiments, the extension arm 202 may be greater than 8 inches.

It is understood that any aspect or element of any embodiment of the apparatus 10 described herein or otherwise may be combined with any aspect or element of any other embodiment to form additional embodiments all of which are within the scope of the apparatus 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. An extension apparatus for a tape measure, the tape measure including a blade and a hook, the extension apparatus comprising:
an attachment portion including a slot;
an extension arm including a proximal end coupled to the attachment portion and a distal end extending away from the attachment portion;
a torque redirection mechanism with a first end coupled to the distal end of the extension arm and a second end extending towards the attachment portion; and
wherein the slot is adapted to receive the blade of the tape measure.

2. The extension apparatus of claim 1, wherein the torque redirection mechanism extends away from the distal end of the extension arm at a first angle with respect to the extension arm.

3. The extension apparatus of claim 2, wherein the first angle is 0°-45°.

4. The extension apparatus of claim 1, wherein the attachment portion includes a front and a back defining an attachment portion length, and a left side and a right side defining an attachment portion width, wherein the slot extends from the front to the back, and from the right side to the left side a distance less than the attachment portion width.

5. The extension apparatus of claim 4, wherein the extension arm is coupled to the attachment portion at a location towards the front of the attachment portion.

6. The extension apparatus of claim 4, wherein the attachment portion's front and back define a longitudinal axis and the extension arm extends away from the attachment portion at an angle substantially perpendicular to the longitudinal axis.

7. The extension apparatus of claim 4, wherein the extension arm includes a front that corresponds to the front of the attachment portion and a back that corresponds to the back of the attachment portion, and the torque redirection mechanism faces the back of the extension arm.

8. The extension apparatus of claim 4, wherein the front of the attachment portion includes a cutout adapted to receive the hook of the tape measure.

9. The extension apparatus of claim 4, wherein the back of the attachment portion includes a cutout adapted to receive the hook of the tape measure.

10. The extension apparatus of claim 1, wherein the slot includes a concave up curvature.

11. The extension apparatus of claim 1, wherein the torque redirection mechanism is adapted to flex with respect to the extension arm.

12. The extension apparatus of claim 4, wherein the attachment portion's front includes a stop adapted to engage the hook of the tape measure.

13. The extension apparatus of claim 4, further comprising a left arm support extending from the front left of the attachment portion to the extension arm and a right arm support extending from the front right of the attachment portion to the extension arm.

14. The extension apparatus of claim 1, wherein the proximal end of the extension arm includes a first width, and the distal end of the extension arm includes a second width, and the first width is greater than or equal to the second width.

15. An extension apparatus for a tape measure, the tape measure including a blade and a hook, the extension apparatus comprising:
an attachment portion including a front and a back defining an attachment portion length, and a left side and a right side defining an attachment portion width, and a first portion and a second portion and a slot between the first portion and the second portion, wherein the slot extends from the front to the back, and from the right side to the left side a distance less than the attachment portion width;
an extension arm including a proximal end coupled to the attachment portion and a distal end extending away from the attachment portion; and
a torque redirection mechanism with a first end coupled to the distal end of the extension arm and a second end extending towards the attachment portion at a first angle with respect to the extension arm, wherein the first angle is 0°-30°;
wherein the slot is adapted to receive the blade of the tape measure.

16. The extension apparatus of claim 15, wherein the extension arm is coupled to the attachment portion at a location towards the front of the attachment portion.

17. The extension apparatus of claim 15, wherein the attachment portion's front and back define a longitudinal axis and the extension arm extends away from the attachment portion at an angle substantially perpendicular to the longitudinal axis.

18. The extension apparatus of claim 15, wherein the extension arm includes a front that corresponds to the front of the attachment portion and a back that corresponds to the back of the attachment portion, and the torque redirection mechanism faces the back of the extension arm.

19. The extension apparatus of claim 15, wherein the front of the attachment portion includes a first cutout and the back of the attachment portion includes a second cutout, the first and second cutouts adapted to receive the hook of the tape measure.

20. The extension apparatus of claim 15, wherein the slot includes a concave up curvature.

* * * * *